(12) United States Patent
Loevenbruck et al.

(10) Patent No.: US 8,906,569 B2
(45) Date of Patent: Dec. 9, 2014

(54) HEAT EXCHANGER FOR A HOT FUEL CELL

(75) Inventors: Come Loevenbruck, Vernon (FR); Dominique Indersie, Vernon (FR); Abdelkrim Boukhalfa, Mont Saint Aignan (FR); Benoit Talbot, Saint Quentin (FR)

(73) Assignee: SNECMA, Paris (FR)

( * ) Notice: Subject to any disclaimer, the term of this patent is extended or adjusted under 35 U.S.C. 154(b) by 40 days.

(21) Appl. No.: 13/516,912

(22) PCT Filed: Dec. 13, 2010

(86) PCT No.: PCT/FR2010/052681
§ 371 (c)(1),
(2), (4) Date: Sep. 26, 2012

(87) PCT Pub. No.: WO2011/073553
PCT Pub. Date: Jun. 23, 2011

(65) Prior Publication Data
US 2013/0017462 A1 Jan. 17, 2013

(30) Foreign Application Priority Data
Dec. 18, 2009 (FR) ...................................... 09 59203

(51) Int. Cl.
*H01M 8/06* (2006.01)
*H01M 8/04* (2006.01)
*F24H 1/28* (2006.01)
*H01M 8/12* (2006.01)

(52) U.S. Cl.
CPC ............ *F24H 1/287* (2013.01); *H01M 8/04074* (2013.01); *F24H 2240/10* (2013.01); *H01M 8/04014* (2013.01); *Y02B 90/14* (2013.01); *H01M 2250/405* (2013.01); *H01M 8/0618* (2013.01); *H01M 2008/1293* (2013.01); *H01M 8/0662* (2013.01); *Y02E 60/525* (2013.01); *Y02E 60/50* (2013.01); *Y02B 90/16* (2013.01); *H01M 2250/10* (2013.01)
USPC .......................................... 429/440; 429/423

(58) Field of Classification Search
None
See application file for complete search history.

(56) References Cited

U.S. PATENT DOCUMENTS

2005/0022535 A1* 2/2005 Palmisano et al. .............. 60/772
2005/0074645 A1* 4/2005 Fattic et al. ...................... 429/26

(Continued)

FOREIGN PATENT DOCUMENTS

EP 1 542 305 6/2005
JP 2005-071834 A 3/2005

(Continued)

OTHER PUBLICATIONS

International Search Report Issued Jul. 8, 2011 in PCT/FR10/52681 Filed Dec. 13, 2010.

(Continued)

*Primary Examiner* — Sarah A Slifka
(74) *Attorney, Agent, or Firm* — Oblon, Spivak, McClelland, Maier & Neustadt, L.L.P.

(57) ABSTRACT

A heat exchanger for operating at an outlet of a hot fuel cell feeding the heat exchanger with oxidizer gas and with fuel gas, the heat exchanger including: a first flow circuit for oxidizer gas; a second flow circuit for fuel gas; a pre-mixer chamber fed both with oxidizer gas and with fuel gas from at least the second circuit; a combustion chamber fed with the gaseous mixture from the pre-mixer chamber and with oxidizer gas from the first circuit; and a flow circuit for flue gas, receiving the flue gas coming from the combustion chamber. The first flow circuit for oxidizer gas, the second flow circuit for fuel gas, the combustion chamber, and the flow circuit for flue gas are immersed in a common cooling fluid.

14 Claims, 4 Drawing Sheets

(56) References Cited

U.S. PATENT DOCUMENTS

| | | | |
|---|---|---|---|
| 2009/0258261 A1* | 10/2009 | Han et al. | 429/17 |
| 2009/0280364 A1* | 11/2009 | Tsunoda et al. | 429/17 |
| 2010/0330446 A1 | 12/2010 | Lucka et al. | |

FOREIGN PATENT DOCUMENTS

| | | |
|---|---|---|
| JP | 2005-228583 A | 8/2005 |
| WO | 92 19920 | 11/1992 |
| WO | 2005 024301 | 3/2005 |
| WO | 2006 136316 | 12/2006 |
| WO | 2008 127122 | 10/2008 |

OTHER PUBLICATIONS

Office Action issued Aug. 25, 2014 in Japanese Patent Application No. 2012-543870 (English Translation).

* cited by examiner

HEAT EXCHANGER FOR A HOT FUEL CELL

FIELD OF THE INVENTION

The present invention relates to the field of heat exchangers enabling the heat contained in a high-temperature gas to be recovered. The invention relates more particularly to the heat exchangers used at the outlet from a hot fuel cell.

BACKGROUND OF THE INVENTION

Fuel cells implement an electrochemical redox reaction while simultaneously producing electricity. For this purpose, the electrodes of the cell need to be fed respectively with a fuel, generally hydrogen, and with an oxidizer, namely oxygen (e.g. taken from a stream of air introduced into the core of the cell).

Hot fuel cells, e.g. such as fuel cells of the solid oxide fuel cell (SOFC) type, operate at very high temperatures (about 900° C.). That makes it possible, in particular, for them to be used advantageously in so-called "cogeneration" systems, i.e. systems that generate both heat energy and electrical energy. Such cogeneration systems may be used equally well in industrial applications and in home applications (e.g. producing heat and electricity in individual houses).

In such systems, the fuel cell needs to be associated with a device such as a boiler or a heat exchanger, which device is capable of recovering the heat from the gas exhausted from the cell. Unfortunately, the gas coming from a hot fuel cell is at very high temperature, thereby making it impossible, downstream from the hot fuel cell, to make use of standard boiler systems designed for processing heat flows at lower temperatures.

Typically, most boilers are made of low-performance materials, such as stainless steel, thereby enabling heat to be exchanged at lower cost between a hot stream and a cooling fluid. Nevertheless, it is very difficult to control the injection and the flow of very high-temperature gases in boiler circuits made of such materials.

One solution to that problem might consist in using high-performance materials that are good at withstanding flows at high temperature. However, the use of such materials would considerably increase the cost of the cogeneration system, which is undesirable, in particular for home applications.

OBJECT AND SUMMARY OF THE INVENTION

An object of the present invention is to mitigate those drawbacks and to provide a heat exchanger design in particular for use at the outlet from a hot fuel cell, e.g. in a cogeneration system, so as to recover all of the heat (both sensible heat and heating value) contained in the high-temperature gas coming from the cell, and to do so without it being necessary to use high-performance materials in the heat exchanger.

This object is achieved by means of a heat exchanger for operating at the outlet of a hot fuel cell feeding said heat exchanger with oxidizer gas and with fuel gas, the heat exchanger comprising:

a first flow circuit for oxidizer gas;
a second flow circuit for fuel gas;
a pre-mixer chamber fed both with oxidizer gas and with fuel gas from at least the second circuit;
a combustion chamber fed with the gaseous mixture from the pre-mixer chamber and with oxidizer gas from the first circuit; and
a flow circuit for flue gas, receiving the flue gas coming from the combustion chamber;

wherein the first flow circuit for oxidizer gas, the second flow circuit for fuel gas, the combustion chamber, and the flow circuit for flue gas are immersed in a common cooling fluid.

The first flow circuit for oxidizer gas and the second flow circuit for fuel gas in the heat exchanger of the invention are fed by respective waste gases from the redox reaction used by the hot fuel cell. These gases are very hot and at a temperature that may be higher than 650° C., e.g. about 900° C. In accordance with the invention, these gases are subjected to "post-combustion" in the combustion chamber of the heat exchanger.

Thus, by immersing the various gas flow circuits (for oxidizer, fuel, and flue gases) and the combustion chamber in the same cooling fluid, the heat exchanger of the invention is capable of recovering all of the heat energy, i.e. both the sensible heat and the heating value, contained in the gases coming from the hot fuel cell.

The invention also makes it possible firstly to reduce the temperature of the gases (oxidizer and fuel) coming from the hot fuel cell, and secondly to reduce the temperature of the combustion chamber.

As a result, the number of components in direct contact with the high-temperature gases is limited, as is their surface area in direct contact therewith. This makes it possible, advantageously, to use low-cost materials, in particular low-performance or stainless steel, for the components of the heat exchanger, such as for example, for the components that serve to inject gases into the combustion chamber.

Furthermore, the reduction in the temperature of the combustion chamber, which is cooled by being immersed in the cooling fluid, enables combustion of the gases to take place at low temperature. This has the effect of reducing the quantities of nitrogen oxide (NOx) given off during combustion.

In addition, the presence of a pre-mixer chamber serves to optimize the uniformity of the fuel/oxidizer mixture as is required for stable combustion in the combustion chamber situated downstream therefrom.

The oxidizer gas fed to the pre-mixer chamber may be taken from the first circuit. Alternatively, the oxidizer gas may be taken from an external flow circuit for oxidizer gas.

Furthermore, in a particular embodiment of the invention, the heat exchanger further comprises a third flow circuit for fuel gas fed to the pre-mixer chamber and immersed in the cooling fluid.

The third circuit makes it possible to have a flow of fuel gas in the heat exchanger of the invention that comes from a source other than the hot fuel cell. The third circuit may thus be fed by a reformer, such as the reformer that may feed the hot fuel cell with hydrogen.

The gas coming from the reformer may equally well be a gas at high-temperature, i.e. at a temperature higher than 650° C. This fuel gas is in itself cooled by the cooling fluid before being fed to the combustion chamber.

In another particular embodiment of the invention, the heat exchanger further comprises an external flow circuit for fuel gas that is fed to the pre-mixer chamber. Such an external circuit makes it possible, if necessary, to increase the energy available for the boiler, particularly if the gas coming from the fuel cell upstream therefrom does not suffice to satisfy the demand for heat from the heat exchanger.

Preferably, the heat exchanger further comprises a first enclosure including the flow circuit for flue gas and the combustion chamber, and a second enclosure including the flow circuits for oxidizer gas and fuel gas, said first and second enclosures being adapted to communicate with each other in such a manner that the cooling fluid flows in both enclosures.

Under such circumstances, the flow circuits for oxidizer gas and fuel gas may in particular be spiral-wound and of substantially identical respective lengths around the first enclosure.

The use of ducts arranged in spirals for the flow circuits serves to improve the efficiency of heat exchange by optimizing the ratio between the distance traveled by the gas through the cooling fluid (length of the circuits) and the resulting overall size of the heat exchanger. The paths traveled by the various oxidizer and fuel gases through the cooling fluid circuit are practically identical. This enables each gas to have the same heat exchange area with the cooling fluid (thereby making gas/fluid exchanges more uniform within the heat exchanger).

In an advantageous provision of the invention that is common to all embodiments, the pre-mixer chamber is separated from the combustion chamber by an injection grid. Under such circumstances, oxidizer gas taken directly from the first circuit is advantageously fed to the combustion chamber in annular manner around the injection grid. Feeding in this way serves to provide film cooling of the walls of the combustion chamber.

According to another advantageous provision of the invention that is common to all embodiments, the oxidizer gas taken directly from the first circuit and feeding the combustion chamber passes via a dilution air chamber formed around the combustion chamber.

The invention also provides a boiler for operating at the outlet from a hot fuel cell, the boiler including a heat exchanger as defined above.

The invention also provides a system for cogeneration of heat energy and of electrical energy, the system comprising a hot fuel cell and a heat exchanger as defined above and fed with oxidizer and fuel gas by the hot fuel cell.

The heat exchanger of the invention thus performs the "heat cogeneration" function of the overall cogeneration system constituted by the heat exchanger and the hot fuel cell, while the fuel cell performs the "electrical cogeneration" function.

In a particular embodiment, the cogeneration system of the invention further comprises a reformer, the heat exchanger including second and third flow circuits for fuel gas, the second and third flow circuits being fed respectively by the hot fuel cell and by the reformer.

BRIEF DESCRIPTION OF THE DRAWINGS

Other characteristics and advantages of the present invention appear from the following description with reference to the accompanying drawings that show embodiments having no limiting character, and in which.

DETAILED DESCRIPTION OF EMBODIMENTS

Figure 1:
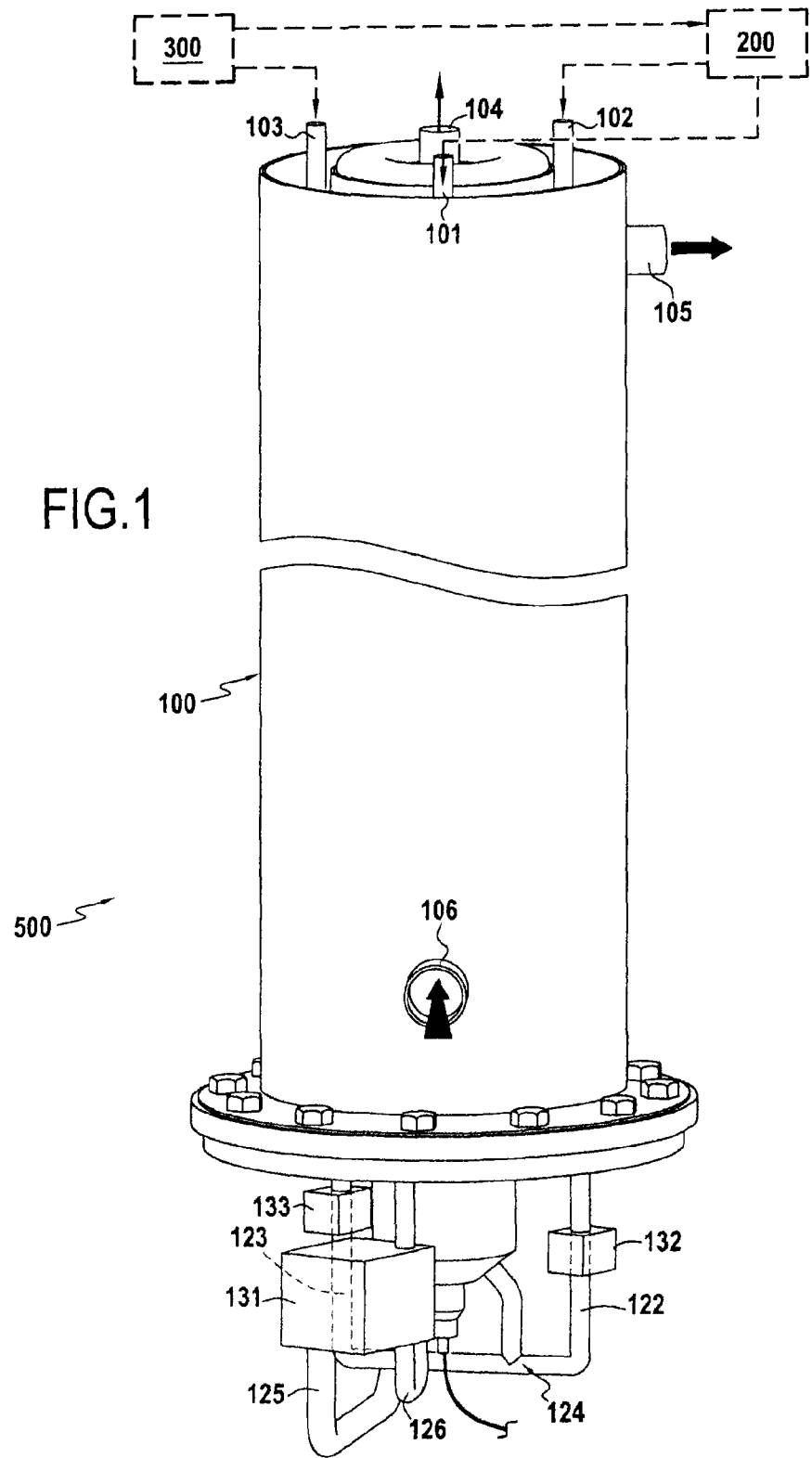
FIG. 1 is a diagrammatic view of a cogeneration system having a heat exchanger in a first embodiment of the invention.

FIG. 1 shows a cogeneration system 500 in accordance with the invention.

The cogeneration system 500 comprises:
a heat exchanger 100 in a first embodiment of the invention; and
downstream from the heat exchanger 100, a hot fuel cell 200 and a reformer 300.

In known manner, a hot fuel cell has an operating temperature that is very high, higher than 650° C. By way of example such a cell is a solid oxide type fuel cell commonly referred to as an SOFC with an operating temperature of about 900° C. The structure and the operation of fuel cells of that type are well known and are not described in greater detail herein.

In order to operate (i.e. in order to enable an electrochemical redox reaction to take place with simultaneous production of electricity), the electrodes of the cell need to be fed respectively with a fuel gas, generally hydrogen, and with an oxidizer gas, namely oxygen, e.g. contained in a stream of air feeding the cell.

In the presently-described example, the reformer 300 is used firstly to feed the cell with fuel gas, i.e. hydrogen in this example, and also to feed the heat exchanger 100 with hydrogen via an inlet 103. The hydrogen coming from the reformer and feeding the heat exchanger has a temperature higher than 650° C. in this example.

As mentioned above, the operating temperature of the hot fuel cell 200 is very high. The cell consequently exhausts both oxidizer gas, mainly oxygen in the form of air, and fuel gas, mainly hydrogen, at very high temperatures (typically higher than 650° C.), with these gases feeding the heat exchanger 100 via respective inlets 101 and 102.

Figure 2:
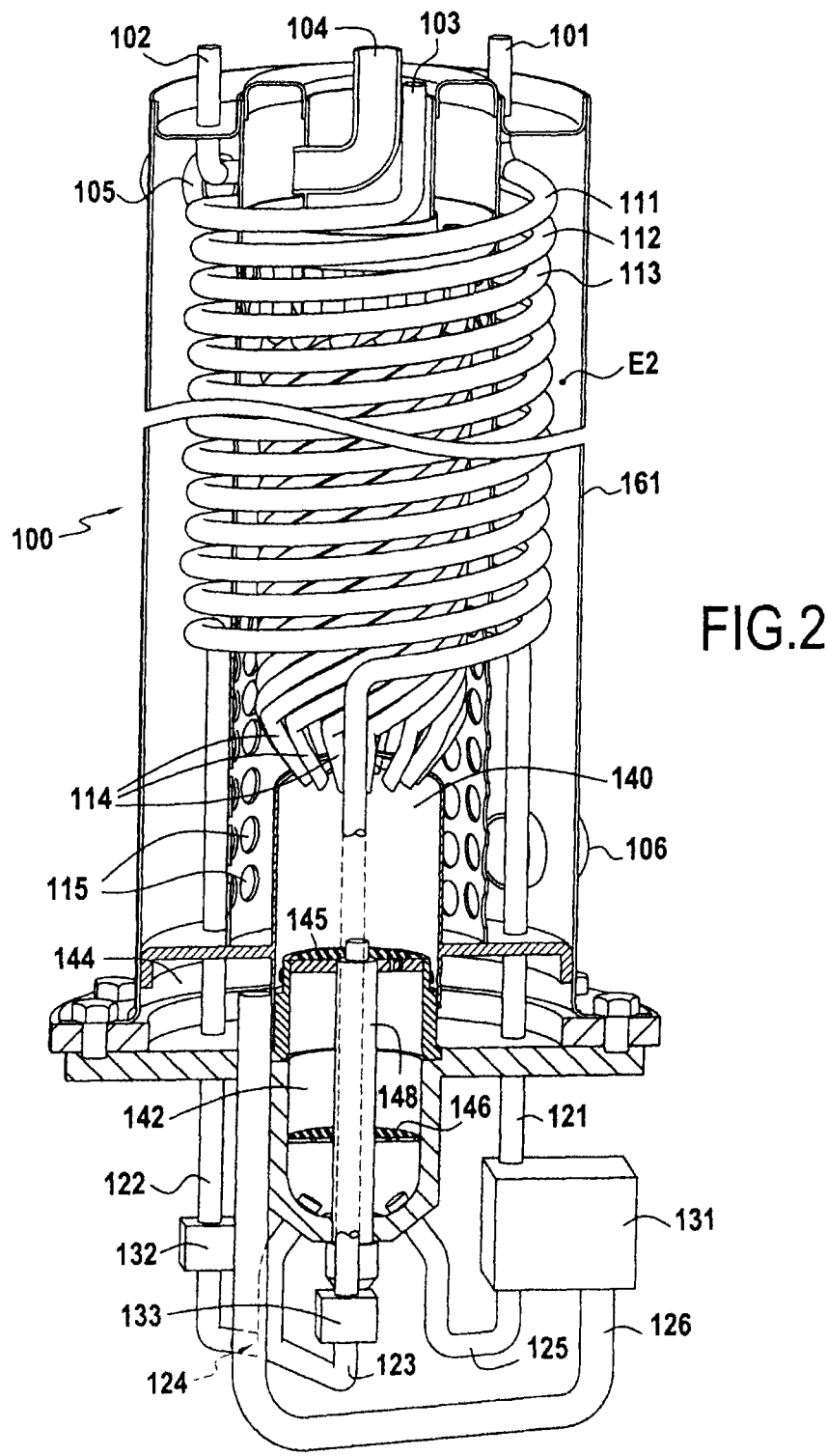
FIG. 2 is a longitudinal section view of the FIG. 1 cogeneration system.
Figure 3:
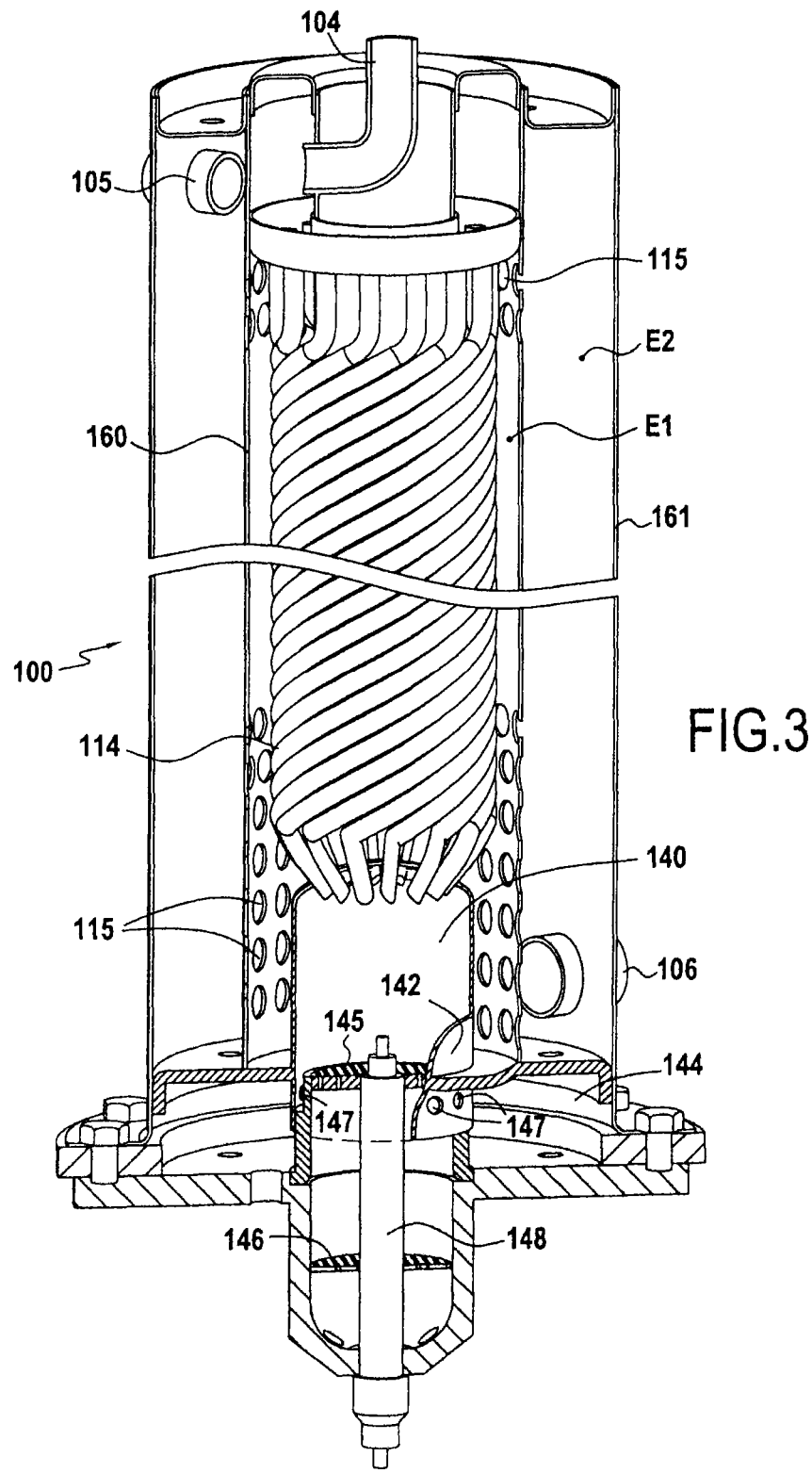
FIG. 3 is a view analogous to that of FIG. 2 showing the cogeneration system with circuits removed therefrom for greater clarity.

As shown in FIGS. 2 and 3, in the embodiment described herein, the heat exchanger 100 has two enclosures:
a first enclosure E1 that is cylindrical and that contains in particular a combustion chamber 140 of substantially cylindrical shape and a circuit 114 for conveying the exhaust gas given off in the combustion chamber; and
a second enclosure E2 situated in the top portion of the heat exchanger 100 and defined by an inner cylindrical wall 160 and an outer cylindrical wall 161. Inside this second enclosure E2 there are to be found in particular a first flow circuit 111 for oxidizer gas (air), a second flow circuit 112 for fuel gas (hydrogen), and a third flow circuit 113 for fuel gas (hydrogen).

The two enclosures E1 and E2 communicate with each other so that the same cooling fluid flows in each of these enclosures E1 and E2, e.g. water. The flow of the cooling fluid is made possible between the two enclosures by means of openings 115 formed in the bottom and top portions of the inner wall 160 of the second enclosure.

Thus, the combustion chamber 140, the first, second, and third flow circuits for oxidizer gas and fuel gas (111, 112, and 113), and the flow circuit 114 for the flue gas coming from the combustion are arranged within a common cooling fluid circuit. Immersing these various circuits and the combustion chamber in a common cooling fluid makes it possible to use that fluid to recover all of the sensible heat and all of the heating value resulting from combustion of the gas from the hot fuel cell and potentially from the reformer.

The heat exchanger 100 is fed with cooling fluid via the feed inlet 106 situated in the bottom portion of the outer wall 161 of the second enclosure E2. The cooling fluid is evacuated from the heat exchanger 100 via the outlet 105 in the top portion of the outer wall 161 of the second enclosure E2. Typically the cooling fluid is then used for heating purposes.

The flow circuits that are located in the second enclosure E2 are fed as follows:
the first flow circuit 111 is fed via the feed inlet 101 for oxidizer gas (air) coming from the hot fuel cell 200;

the second flow circuit 112 is fed, via the feed inlet 102, with fuel gas (hydrogen) coming from the hot fuel cell 200; and the third flow circuit 113 is fed, via the feed inlet 103, with fuel gas (hydrogen) coming directly from the reformer 300.

The three flow circuits 111, 112, and 113 are formed by ducts arranged as spiral coils and placed in alternation inside the second enclosure E2 around the first enclosure E1. In known manner, the number of turns of the ducts depends on the performance of the heat exchanger 100. In the presently-described example, the numbers of turns in the various ducts 111, 112, and 113 are identical, so that each gas has the same heat exchange area with the cooling fluid (i.e. the same path through the heat exchanger 100). This makes it possible to make heat exchanges between the gases flowing in the three ducts and the cooling fluid more uniform in order to cool those gases.

At the outlet from the second enclosure E2, the first flow circuit 111 is extended by a duct 121 to a control valve 131. Downstream from the control valve the first flow circuit is extended by two ducts, namely one duct 125 leading into a pre-mixer chamber 142 formed upstream from the combustion chamber 140, and another duct 126 leading into a dilution air chamber 144 formed around the combustion chamber 140.

At the outlet from the second enclosure E2, the second and third flow circuits 112 and 113 are extended by respective ducts 122 and 123 that are connected together at a junction 124 to lead into the pre-mixer chamber 142.

As a result, the pre-mixer chamber 142 is fed by oxidizer gas taken from the first flow circuit 111 and with fuel gas taken from the second and third flow circuits 112 and 113. Since these gases have been cooled by flowing along the flow circuits 111 to 113, the hydrogen and air can be mixed together without any risk of self-ignition prior to being injected into the combustion chamber 140.

Furthermore, since this mixture has a temperature well below that of the gas fed to the heat exchanger 100 and coming from the fuel cell 200, this mixture can be injected into the combustion chamber 140 using low-performance materials, e.g. made of stainless steel, of the kind commonly used in commercially-available boilers.

The combustion chamber 140 is fed firstly with the oxidizer/fuel gas mixture coming from the pre-mixer chamber 142 (passing through an injection grid 145 described in detail below), and secondly by oxidizer gas taken from the first flow circuit 111 and passing via the dilution air chamber 144 (via the duct 126).

The pre-mixer chamber 142 leads into the combustion chamber 140 via an injection grid 145. Such an injection grid has a large number of holes (e.g. circular holes) of small section. The number of holes, their size, and their depth are selected so as to obtain a gas flow speed that makes it possible for the flame to be attached to the injection grid, to avoid the flame rising towards the pre-mixer chamber, and to obtain a flame that is short, thereby limiting the length required for the combustion chamber.

The pre-mixer chamber 142 may also have a mixer grid 146 separating its inside volume into two portions. Such a mixer grid serves to improve mixing between the oxidizer gas and the fuel gas.

Furthermore, the combustion chamber 140 is fed with the oxidizer gas coming from the dilution air chamber 144 in annular manner around the injection grid 145. For this purpose, the cylindrical wall defining the combustion chamber includes, in register with the injection grid 145, a plurality of orifices 147 opening into the pre-mixer chamber 142 and leading into the combustion chamber (FIG. 3).

Finally, the combustion chamber 140 includes a post-combustion ignitor 148 centered on the injection grid 145 and serving to ignite the oxidizer/fuel mixture.

The ducts 122 and 123 are fitted with respective devices 132 and 133 that serve to control and regulate the delivery of fuel gas into the pre-mixer chamber 142 (and thus into the combustion chamber 140). The devices 132 and 133, and also the control valve 131 fitted to the pipe 121 may for example be solenoid valves controlled by a control device (not shown in the figures).

The devices 132 and 133 may also serve to select the hydrogen feed source for the pre-mixer chamber 142. Thus, for example, during certain transient conditions in the reformer 300, in particular while it is starting, the quantity of hydrogen delivered by the reformer does not enable the fuel cell 200 to operate normally. Under such circumstances, the device 132 is controlled so that the combustion chamber 140 is, at that time, fed with hydrogen coming from the reformer (gas from the third flow circuit 113).

When the transient conditions have terminated, the device 132 is controlled so as to open the circuit 122 in which flows the hydrogen coming from the cell 200, and the device 133 is also controlled so as to close the circuit 123 in which there flows the hydrogen coming from the reformer 300.

As mentioned above, the combustion chamber 140 is itself immersed in the cooling fluid inside the enclosure E1, thereby enabling its temperature to be lowered. This serves advantageously to reduce the quantities of nitrogen oxides (NOx) emitted during combustion of the gas mixture.

The flue gases coming from the combustion chamber 142 are collected in the flow circuit 114 formed by a plurality of ducts arranged as spirals. These ducts are also immersed in the cooling fluid of the enclosure E1, such that the heat contained in the combustion flue gases is also recovered by the fluid, which fluid can be used for heating purposes.

The cooled flue gas is then recovered by a manifold 104 at the outlet from the ducts of the circuit 114.

Thus, by means of the invention, it is possible to recover all of the heat (sensible heat and heating value) of the gases coming from the hot fuel cell (and possibly from the reformer) while enabling low-performance materials to be used for the heat exchanger. This is made possible by immersing in a common cooling fluid the flow circuit for the gas from the fuel cell and from the reformer, and also the combustion chamber and the flow circuit for flue gas coming from the combustion. As a result, not only is the sensible heat of the gas recovered by the fluid, but the heating value of the gas is also converted into heat and delivered to the same fluid.

Figure 4:
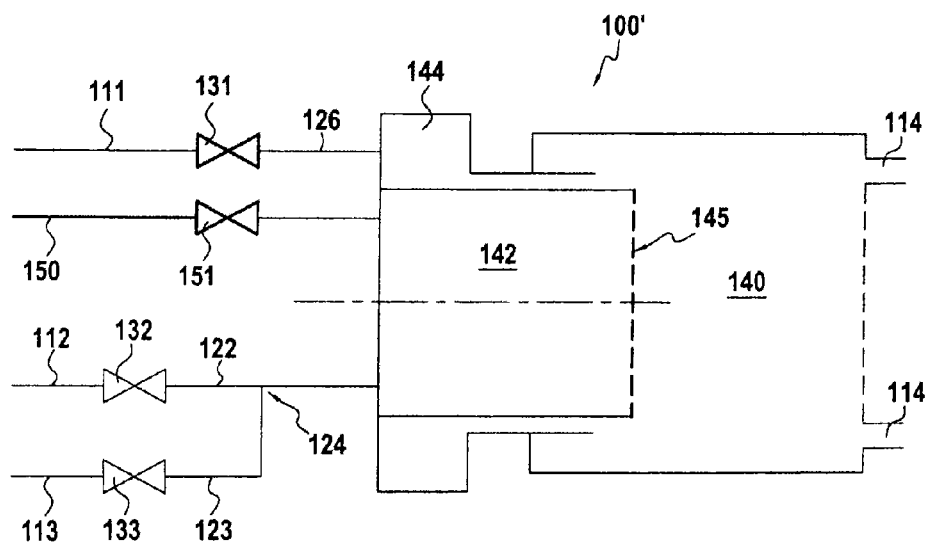
FIGS. 4 and 5 are functional diagrams of heat exchangers in second and third embodiments of the invention.

FIG. 4 is a functional diagram showing a heat exchanger 100' in a second embodiment of the invention.

The heat exchanger 100' differs from the heat exchanger described above with reference to FIGS. 1 to 3 in that the oxidizer gas feeding the pre-mixer chamber 142 comes from an external oxidizer gas flow circuit 150 in which flow rate is adjustable (e.g. by means of a solenoid valve 151). Furthermore, the first flow circuit 111 is connected solely to the dilution air chamber 144 (via the duct 126), and the device 131 mounted in the circuit 111 is a solenoid valve.

The presence of the external circuit 150 for passing a flow of oxidizer gas presents the advantage of providing greater flexibility in adjusting the flow rate of the oxidizer gas.

Figure 5:
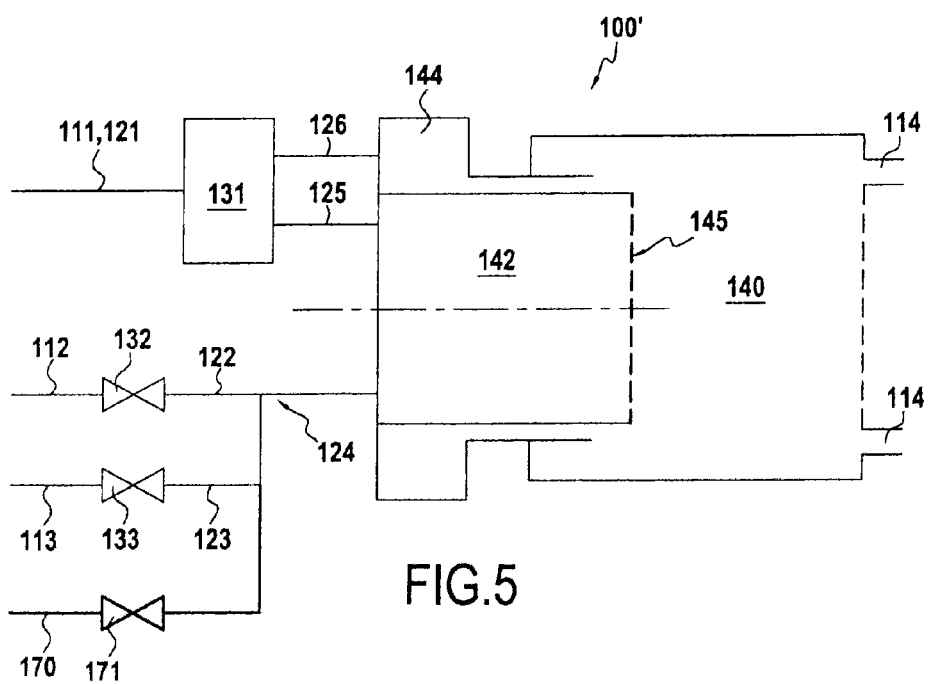

FIG. 5 is a functional diagram showing a heat exchanger 100" in a third embodiment of the invention.

This heat exchanger 100" differs from that described with reference to FIGS. 1 to 3 in that it further includes an external circuit 170 for conveying a flow of fuel gas that is fed to the pre-mixer chamber 142. The external circuit 170 is controlled, e.g. by means of a solenoid valve 171.

More precisely, the external circuit 170 for conveying a flow of fuel gas is connected to the junction 124 between the ducts 122 and 123 of the second and third flow circuits 112 and 113.

The presence of the external fuel gas flow circuit 170 has the advantage of making it possible, where necessary, to increase the energy available for the boiler, in particular if the gas coming from the upstream fuel cell does not suffice to satisfy the heat demand on the heat exchanger.

The invention claimed is:

1. A heat exchanger for operating at an outlet of a hot fuel cell feeding the heat exchanger with oxidizer gas and with fuel gas, the heat exchanger comprising:
   a first flow circuit for oxidizer gas;
   a second flow circuit for fuel gas;
   a pre-mixer chamber fed both with oxidizer gas and with fuel gas from at least the second circuit;
   a combustion chamber fed with the gaseous mixture from the pre-mixer chamber and with oxidizer gas from the first circuit;
   a flow circuit for flue gas, receiving the flue gas coming from the combustion chamber;
   a first enclosure including the flow circuit for flue gas and the combustion chamber, and a second enclosure including the first flow circuit for oxidizer gas and the second flow circuit for fuel gas, the first and second enclosures configured to communicate with each other such that a cooling fluid flows in both enclosures; and
   an inner cylindrical wall and an outer cylindrical wall,
   wherein the first flow circuit for oxidizer gas, the second flow circuit for fuel gas, the combustion chamber, and the flow circuit for flue gas are immersed in a common cooling fluid,
   wherein the second enclosure is defined between the inner cylindrical wall and the outer cylindrical wall, and the first enclosure is defined by the inner cylindrical wall, and
   wherein the first and second flow circuit present ducts arranged for spiral coils which are placed inside the second enclosure around the first enclosure.

2. A heat exchanger according to claim 1, wherein the oxidizer gas feeding the pre-mixer chamber is taken from the first circuit.

3. A heat exchanger according to claim 1, wherein the oxidizer gas feeding the pre-mixer chamber is taken from an external flow circuit for the oxidizer gas.

4. A heat exchanger according to claim 1, further comprising a third flow circuit for fuel gas feeding the pre-mixer chamber and immersed in the cooling fluid.

5. A heat exchanger according to claim 4, further comprising an external flow circuit for fuel gas feeding the pre-mixer chamber.

6. A heat exchanger according to claim 1, wherein the pre-mixer chamber is separated from the combustion chamber by an injection grid.

7. A heat exchanger according to claim 6, wherein the oxidizer gas taken directly from the first circuit is fed to the combustion chamber in an annular manner around the injection grid.

8. A heat exchanger according to claim 1, wherein the oxidizer gas taken directly from the first circuit and feeding the combustion chamber passes via a dilution air chamber formed around the combustion chamber.

9. A heat exchanger according to claim 1, wherein the cooling fluid is water.

10. A heat exchanger according to claim 1, wherein the spiral coils of the first and second flow circuits are placed in alternation.

11. A heat exchanger according to claim 1, wherein an inlet for the cooling fluid is disposed at a bottom portion of the outer cylindrical wall and an outlet for the cooling fluid is disposed in a top portion of the outer cylindrical wall.

12. A boiler for operating at an outlet from a hot fuel cell, the boiler comprising a heat exchanger according to claim 1.

13. A system for cogeneration of heat energy and of electrical energy, the system comprising:
   a hot fuel cell; and
   a heat exchanger according to claim 1 and fed with oxidizer gas and fuel gas by the hot fuel cell.

14. A system according to claim 13, further comprising a reformer, the heat exchanger including the second flow circuit and a third flow circuit for fuel gas, the second and third flow circuits being fed respectively by the hot fuel cell and by the reformer.

* * * * *